(12) United States Patent
Bora et al.

(10) Patent No.: US 11,468,091 B2
(45) Date of Patent: Oct. 11, 2022

(54) MAINTAINING CONSISTENCY OF ASYNCHRONOUS REPLICATION

(71) Applicant: EMC IP Holding Company LLC, Hopkinton, MA (US)

(72) Inventors: Bhaskar Bora, Shrewsbury, MA (US); Mark J. Halstead, Holliston, MA (US); Michael E. Specht, Bolton, MA (US); Benjamin Yoder, Chandler, AZ (US); Deepak Vokaliga, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 17/023,525

(22) Filed: Sep. 17, 2020

(65) Prior Publication Data
US 2022/0083564 A1 Mar. 17, 2022

(51) Int. Cl.
*G06F 16/27* (2019.01)
*G06F 12/0802* (2016.01)

(52) U.S. Cl.
CPC ........ *G06F 16/273* (2019.01); *G06F 12/0802* (2013.01); *G06F 2212/1032* (2013.01); *G06F 2212/154* (2013.01)

(58) Field of Classification Search
CPC ............... G06F 16/273; G06F 12/0802; G06F 2212/1032; G06F 2212/154
See application file for complete search history.

(56) References Cited

U.S. PATENT DOCUMENTS

| 5,537,568 | A  | 7/1996 | Yanai et al. |
| 6,594,742 | B1 | 7/2003 | Ezra |
| 7,054,883 | B2 | 5/2006 | Meiri et al. |

*Primary Examiner* — Alford W Kindred
*Assistant Examiner* — Lin Lin M Htay
(74) *Attorney, Agent, or Firm* — Muirhead and Saturnelli, LLC

(57) ABSTRACT

Maintaining consistency for asynchronous replication of LUNs of a local storage system to corresponding LUNs of a remote storage system includes copying application data written to LUNs to cache slots, copying metadata of LUNs to cache slots, associating a first sequence number to all metadata modifications and all application data writes that are begun after a first time and before a second time, associating a second sequence number, different from the first sequence number, to all metadata modifications and all application data writes that are begun after the second time, and, after completion of all metadata modifications and all application data writes associated with the first sequence number, initiating transfer to the remote storage system of all metadata modifications and all application data writes associated with the first sequence number. Each cache slot may include a field that indicates a corresponding sequence number.

20 Claims, 6 Drawing Sheets

MAINTAINING CONSISTENCY OF ASYNCHRONOUS REPLICATION

BACKGROUND OF THE INVENTION

1. Technical Field

This application relates to computer storage systems, and more particularly to the field of transferring data between storage systems.

2. Description of Related Art

Virtualization allows creation of software-based representations of physical computing devices, such as servers. Each of the software-based representations is a virtual machine (VM) that is logically separated from other virtual machines and runs its own operating system. Thus, for example, a first VM may run a first operating system and a second VM on the same physical computing device may run a second operating system different from the first operating system. Note that the number of VMs that may run at the same time on a physical computing device may be limited only by the resources of the physical computing device, such as memory.

Each VM requires storage for the VM image in the same way that a physical computing device, such as a laptop, needs non-volatile storage (e.g., a disk drive) for the operating system, programs, application data, etc. The storage for VMs may be provided in a virtual volume (VVol), which may be implemented as a virtualization of SAN and/or NAS physical storage so that the hosts (VMs) do not need to be aware of the physical storage but, instead, accesses the VVol, which uses a VVol framework, to deliver storage functionality to the host. In some cases, the underlying physical storage system may be provided by array storage systems, such as the Dell EMC PowerMax array storage system or similar.

In systems where it is desirable to provide disaster recovery, VM and VVol storage may be backed up from a primary site to a recovery site using, for example, the Remote Data Facility (RDF) product provided by Dell/EMC Corporation of Hopkinton, Mass. With RDF, a first storage system, denoted the "primary storage system" (or "R1") is coupled to the host. One or more other storage systems, called "secondary storage systems" (or "R2") receive copies of the application data that is written to the primary storage system by the host. The host interacts directly with the primary storage system, but any application data changes made to the primary storage system are automatically provided to the one or more secondary storage systems using RDF. RDF allows synchronous application data transfer where, after application data that is written from a host to a primary storage system is transferred from the primary storage system to a secondary storage system using RDF, receipt is acknowledged by the secondary storage system to the primary storage system which then provides a write acknowledge back to the host. Thus, in synchronous mode, the host does not receive a write acknowledge from the primary storage system until the RDF transfer to the secondary storage system has been completed and acknowledged by the secondary storage system.

A drawback to synchronous RDF is that the latency of each of the write operations is increased by waiting for the acknowledgement of the RDF transfer. This problem is worse when there is a long distance between the primary storage system and the secondary storage system; because of transmission delays, the time delay required for making the RDF transfer and then waiting for an acknowledgement back after the transfer is complete may be unacceptable. This may be addressed by using an asynchronous mode where the primary storage system copies application data to the secondary storage system in the background. However, an issue with asynchronous copying though is that, in some instances, applications, such as database applications, need to write application data in a specific order that must be preserved (e.g., write number 1 must be followed by write number 2 which must be followed by write number 3, and so on). The successive writes are dependent on particular previous writes. Asynchronous copying, by itself, does not necessarily preserve dependent write order. This issue is addressed, however, by a product provided by Dell/EMC of Hopkinton, Mass. called SRDF/A where dependent writes are provided in successive chunks of application data that guarantee preservation of write order dependency.

Although SRDF/A may be very effective at preserving write dependencies of application data, SRDF/A does not transfer any metadata (data about the application data) and thus does nothing in connection with preserving write dependencies of metadata at the R2 volume. In many instances, this is not an issue, but in the case of virtualization, some of the functionality provided therewith (e.g., vMotion functionality provided by VMware) may require that metadata be transferred to a recovery site for proper operation. However, since SRDF/A uses cache slots and destages application data from the cache slots, there's no mechanism in SRDF/A for transferring or preserving write dependencies of metadata.

Accordingly, it is desirable to provide a mechanism for asynchronously transferring metadata in a way that preserves write dependencies of the metadata.

SUMMARY OF THE INVENTION

According to the system described herein, maintaining consistency for asynchronous replication of LUNs of a local storage system to corresponding LUNs of a remote storage system includes copying application data written to LUNs of the local storage system to corresponding cache slots, copying metadata of LUNs of the local storage system to corresponding cache slots of the local storage system in response to modifying the metadata of the LUNs, associating a first sequence number to all metadata modifications and all application data writes for any of the LUNs of the local storage system that are begun after a first time and before a second time, associating a second sequence number, different from the first sequence number, to all metadata modifications and all application data writes for any of the LUNs of the local storage system that are begun after the second time, and, after completion of all metadata modifications and all application data writes associated with the first sequence number, initiating transfer to the remote storage system of all metadata modifications and all application data writes associated with the first sequence number. Metadata for a particular one of the LUNs of the first storage system that is modified after the first time and before the second time may overwrite data in the cache for previously modified metadata for the particular one of the LUNs that was modified after the first time and before the second time. The metadata modifications and application data writes associated with the first sequence number may be stored at the remote storage system in response to receiving a commit message from the local storage system. The local storage system may use a first list of pointers to the cache slots for application data and metadata associated with the first sequence number and may use a second list of pointers to the cache slots for application data and metadata associated with the second sequence number. Each cache slot may include a field that indicates a corresponding sequence number. A new slot may be allocated in response to a modification of metadata for a particular one of the LUNs of the local storage system after the first time and before the second time. The new slot may be allocated only if the modification is a first modification for the metadata for the particular one of the LUNs after the first time and before the second time. The local storage system and the remote storage system may store virtual volumes that are accessed by virtual machines. A particular one of the LUNs of the remote storage system may be determined to be consistent only if all of the application data and all of the metadata corresponding to a particular sequence number have been committed at the remote storage system. All metadata modifications and all application data writes for any of the LUNs of the local storage system that are begun after the second time may be stored in different slots than any metadata modifications and application data writes for any of the LUNs of the local storage system that are begun before the second time.

According further to the system described herein, a non-transitory computer readable medium contains software that maintains consistency for asynchronous replication of LUNs of a local storage system to corresponding LUNs of a remote storage system. The software includes executable code that copies application data written to LUNs of the local storage system to corresponding cache slots, executable code that copies metadata of LUNs of the local storage system to corresponding cache slots of the local storage system in response to modifying the metadata of the LUNs, executable code that associates a first sequence number to all metadata modifications and all application data writes for any of the LUNs of the local storage system that are begun after a first time and before a second time, executable code that associates a second sequence number, different from the first sequence number, to all metadata modifications and all application data writes for any of the LUNs of the local storage system that are begun after the second time, and executable code that initiates transfer to the remote storage system of all metadata modifications and all application data writes associated with the first sequence number after completion of all metadata modifications and all application data writes associated with the first sequence number. Metadata for a particular one of the LUNs of the first storage system that is modified after the first time and before the second time may overwrite data in the cache for previously modified metadata for the particular one of the LUNs that was modified after the first time and before the second time. The metadata modifications and application data writes associated with the first sequence number may be stored at the remote storage system in response to receiving a commit message from the local storage system. The local storage system may use a first list of pointers to the cache slots for application data and metadata associated with the first sequence number and may use a second list of pointers to the cache slots for application data and metadata associated with the second sequence number. Each cache slot may include a field that indicates a corresponding sequence number. A new slot may be allocated in response to a modification of metadata for a particular one of the LUNs of the local storage system after the first time and before the second time. The new slot may be allocated only if the modification is a first modification for the metadata for the particular one of the LUNs after the first time and before the second time. The local storage system and the remote storage system may store virtual volumes that are accessed by virtual machines. A particular one of the LUNs of the remote storage system may be determined to be consistent only if all of the application data and all of the metadata corresponding to a particular sequence number have been committed at the remote storage system. All metadata modifications and all application data writes for any of the LUNs of the local storage system that are begun after the second time may be stored in different slots than any metadata modifications and application data writes for any of the LUNs of the local storage system that are begun before the second time.

BRIEF DESCRIPTION OF DRAWINGS

Embodiments of the system are described with reference to the several figures of the drawings, noted as follows.

DETAILED DESCRIPTION OF VARIOUS EMBODIMENTS

The system described herein provides write order consistency for LUN metadata in connection with asynchronously transferring LUN application data using cache slots and sequence numbers to form chunks of data that are transmitted asynchronously. Application data may be data that is written to a LUN by an application on a host while metadata may be data about the application data that is written and accessed, for example, by operating system components of the host. Metadata may be information about the application data such as time of creation, time of last access, data type, identifier of creator, etc.

Figure 1:
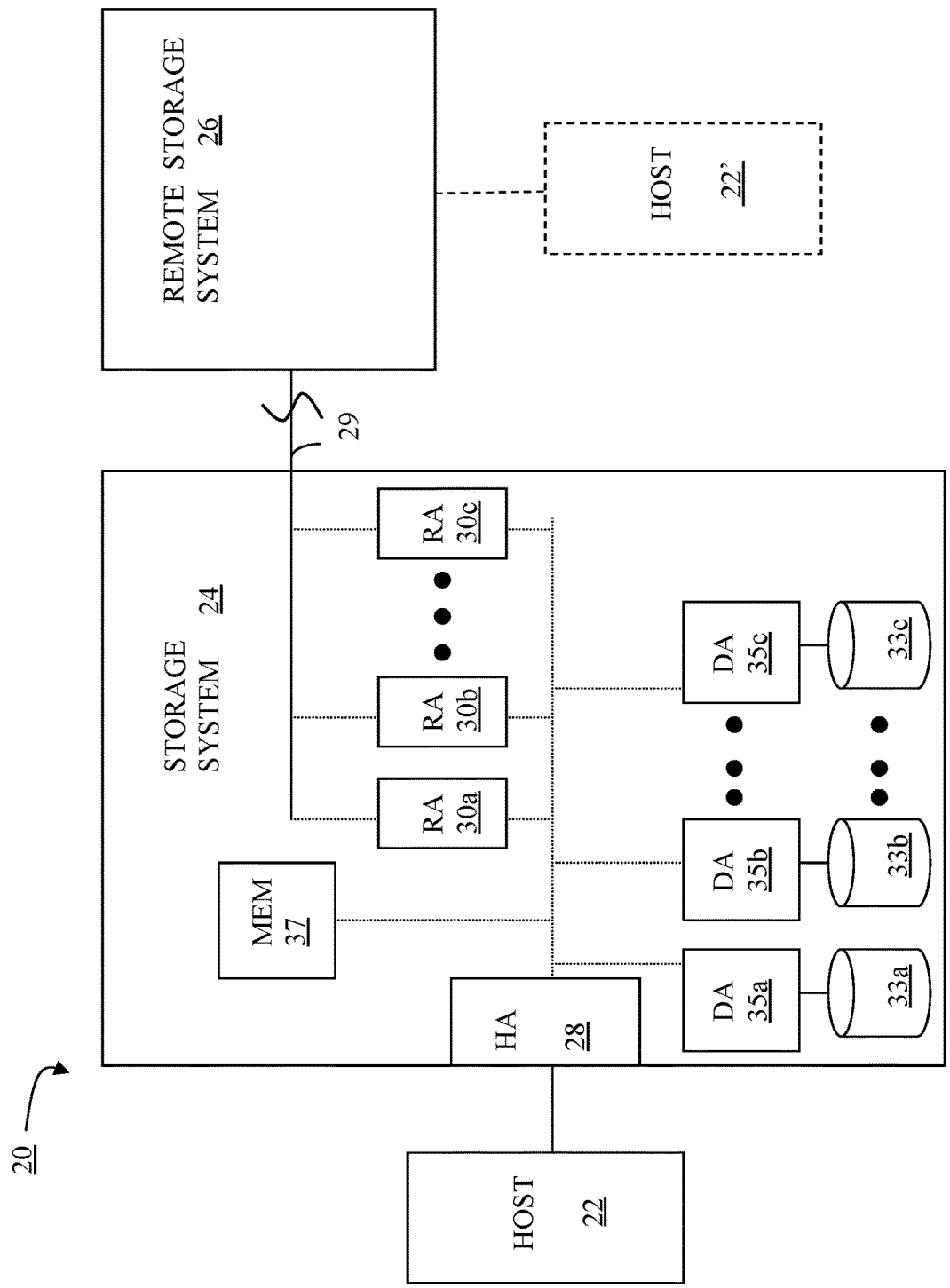
FIG. 1 is a schematic illustration of a storage system showing a relationship between a host, a local storage system, and a remote storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30*a*, 30*b*, 30*c*. The RA's 30*a*-30*c* may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33*a*-33*c*. The physical storage units 33*a*-33*c* may be non-volatile. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33*a*-33*c* may be coupled to a corresponding disk adapter unit (DA) 35*a*-35*c* that provides data to a corresponding one of the physical storage units 33*a*-33*c* and receives data from a corresponding one of the physical storage units 33*a*-33*c*. An internal data path exists between the DA's 35*a*-35*c*, the HA 28 and the RA's 30*a*-30*c* of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35*a*-35*c*, the HA 28 and the RA's 30*a*-30*c* as well as facilitate other operations. The memory 37 may contain task indicators that indicate tasks to be performed by one or more of the DA's 35*a*-35*c*, the HA 28 and/or the RA's 30*a*-30*c*, and may contain a cache for data fetched from one or more of the physical storage units 33*a*-33*c*.

The storage space in the storage system 24 that corresponds to the physical storage units 33*a*-33*c* may be subdivided into a plurality of volumes or logical devices (LUNs). The LUNs may or may not correspond to the storage space of the physical storage units 33*a*-33*c*. Thus, for example, the physical storage unit 33*a* may contain a plurality of LUNs or, alternatively, a single LUN could span both of the physical storage units 33*a*, 33*b*. Similarly, the storage space for the remote storage system 26 may be subdivided into a plurality of volumes or LUNs, where each of the LUNs may or may not correspond to one or more physical storage units of the remote storage system 26. In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22. The storage systems 24, 26 may be part a virtualization system and may store virtual volumes that are accessed by virtual machines. The virtualization system may use vSphere APIs for Storage Awareness (VASA) to permit the storage systems 24, 26 to integrate with the virtualization system. One or both of the hosts 22, 22' may be virtual machines. In other embodiments, it is possible for the storage systems 24, 26 to be accessed by physical computing systems and to not contain any virtual volumes.

It is possible to mirror data between the storage systems 24, 26 using an RDF (Remote Data Facility) mapping. Providing an RDF mapping between the local storage system 24 and the remote storage system 26 involves setting up a LUN on the remote storage system 26 that is a remote mirror for a LUN on the local storage system 24. The host 22 reads and writes data from and to the LUN on the local storage system 24 and the RDF mapping causes modified data to be transferred from the local storage system 24 to the remote storage system 26 using the RA's, 30*a*-30*c*, 32*a*-32*c* and the RDF link 29. In steady state operation, the LUN on the remote storage system 26 contains data that is identical to the data of the LUN on the local storage system 24. The LUN on the local storage system 24 that is accessed by the host 22 is referred to as the "R1 volume" (or just "R1") while the LUN on the remote storage system 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
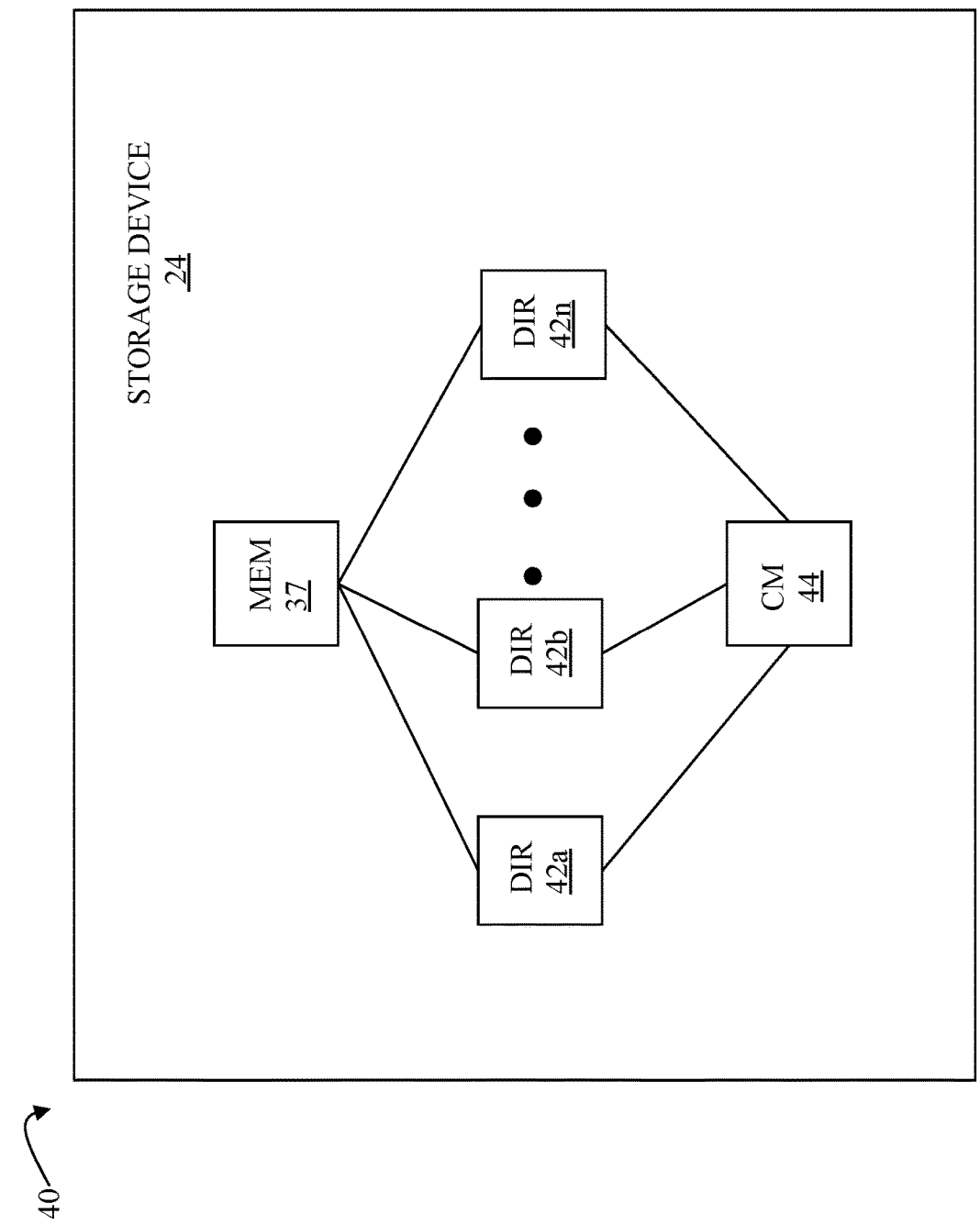
FIG. 2 is a schematic diagram illustrating a storage system where each of a plurality of directors are coupled to a memory according to an embodiment of the system described herein.

FIG. 2 is a schematic diagram 40 illustrating an embodiment of the storage system 24 where each of a plurality of directors 42*a*-42*n* are coupled to the memory 37. Each of the directors 42*a*-42*n* represents at least one of the HA 28, RAs 30*a*-30*c*, or DAs 35*a*-35*c*. The diagram 40 also shows an optional communication module (CM) 44 that provides an alternative communication path between the directors 42*a*-42*n*. Each of the directors 42*a*-42*n* may be coupled to the CM 44 so that any one of the directors 42*a*-42*n* may send a message and/or data to any other one of the directors 42*a*-42*n* without needing to go through the memory 37. The CM 44 may be implemented using conventional MUX/router technology where one of the directors 42*a*-42*n* that is sending data provides an appropriate address to cause a message and/or data to be received by an intended one of the directors 42*a*-42*n* that is receiving the data. Some or all of the functionality of the CM 44 may be implemented using one or more of the directors 42*a*-42*n* so that, for example, the directors 42*a*-42*n* may be interconnected directly with the interconnection functionality being provided on each of the directors 42a-42n. In addition, one or more of the directors 42a-42n may be able to broadcast a message to all or at least some plurality of the other directors 42a-42n at the same time. In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA or an HA and an RA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
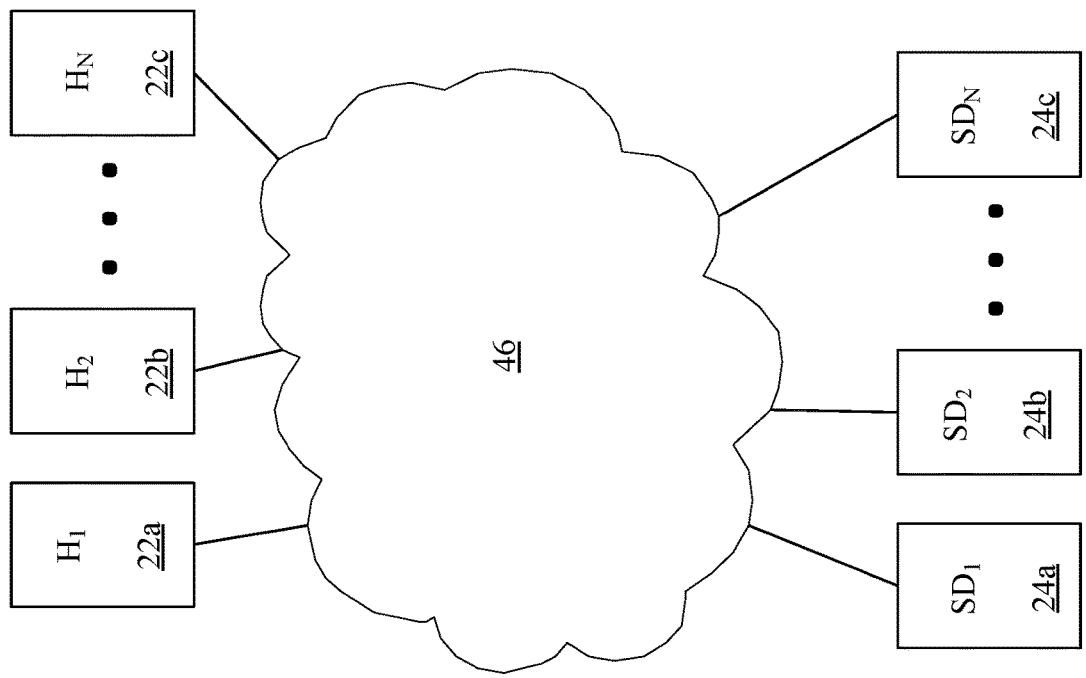
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration showing a storage area network (SAN) 46 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
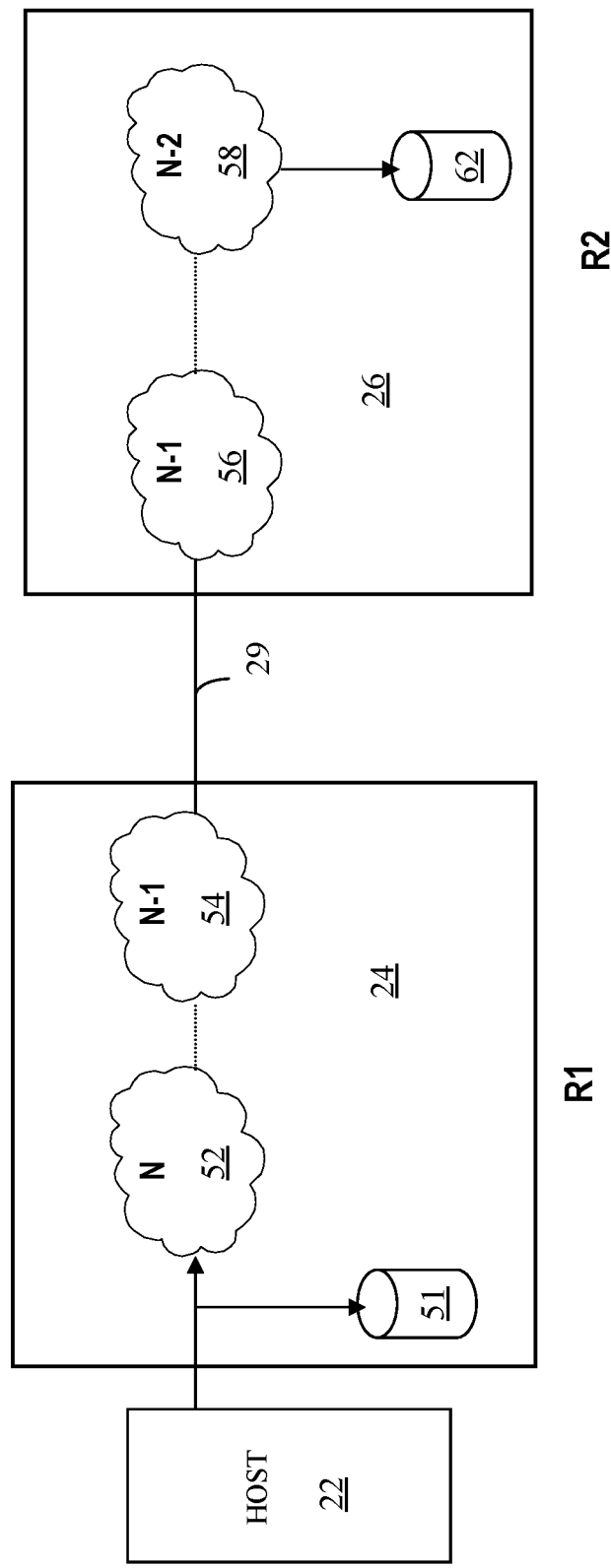
FIG. 4 is a schematic diagram showing a flow of data between a host, a local storage system, and a remote storage system used in connection with an embodiment of the system described herein.

Referring to FIG. 4, a path of data is illustrated from the host 22 to the local storage system 24 and the remote storage system 26 where data is replicated asynchronously from the local storage system 24 to the remote storage system 26. Data written from the host 22 to the local storage system 24 is stored locally, as illustrated by the data element 51 of the local storage system 24. The data that is written by the host 22 to the local storage system 24 is also maintained by the local storage system 24 in connection with being sent by the local storage system 24 to the remote storage system 26 via the link 29.

In the system described herein, each data write by the host 22 (of, for example a record, a plurality of records, a track, etc.) is assigned a sequence number. The sequence number may be provided in an appropriate data field associated with the write. In FIG. 4, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage system 24 accumulates chunks of one sequence number while transmitting a previously accumulated chunk (having the previous sequence number) to the remote storage system 26. Thus, while the local storage system 24 is accumulating writes from the host 22 that are assigned sequence number N, the writes that occurred for the previous sequence number (N−1) are transmitted by the local storage system 24 to the remote storage system 26 via the link 29. A chunk 54 represents writes from the host 22 that were assigned the sequence number N−1 that have not been transmitted yet to the remote storage system 26.

The remote storage system 26 receives the data from the chunk 54 corresponding to writes assigned a sequence number N−1 and constructs a new chunk 56 of host writes having sequence number N−1. The data may be transmitted using appropriate protocol (e.g., RDF protocol) that acknowledges data sent across the link 29. When the remote storage system 26 has received all of the data from the chunk 54, the local storage system 24 sends a commit message to the remote storage system 26 to commit all the data assigned the N−1 sequence number corresponding to the chunk 56. Generally, once a chunk corresponding to a particular sequence number is committed, that chunk may be written to a LUN. This is illustrated in FIG. 4 with a chunk 58 corresponding to writes assigned sequence number N−2 (i.e., two before the current sequence number being used in connection with writes by the host 22 to the local storage system 26). In FIG. 4, the chunk 58 is shown as being written to a data element 62 representing non-volatile storage for the remote storage system 26. Thus, the remote storage system 26 is receiving and accumulating the chunk 56 corresponding to sequence number N−1 while the chunk 58 corresponding to the previous sequence number (N−2) is being written to non-volatile storage of the remote storage system 26 illustrated by the data element 62. In some embodiments, the data for the chunk 58 is marked for write (but not necessarily written immediately), while the data for the chunk 56 is not.

Thus, in operation, the host 22 writes data to the local storage system 24 that is stored locally in the data element 51 and is accumulated in the chunk 52. Once all of the data for a particular sequence number has been accumulated (described elsewhere herein), the local storage system 24 increments the sequence number. Data from the chunk 54 corresponding to one less than the current sequence number is transferred from the local storage system 24 to the remote storage system 26 via the link 29. The chunk 58 corresponds to data for a sequence number that was committed by the local storage system 24 sending a message to the remote storage system 26. Data from the chunk 58 is written to disk storage of the remote storage system 26.

Note that the writes within a particular one of the chunks 52, 54, 56, 58 are not necessarily ordered. However, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage system 24 and the remote storage system 26, the remote storage system 26 may simply finish writing the last committed chunk of data (the chunk 58 in the example of FIG. 4) and can be assured that the state of the data at the remote storage system 26 is ordered in the sense that the data element 62 contains all of the writes that were begun prior to a certain point in time and contains no writes that were begun after that point in time. Thus, R2 always contains a consistent point in time copy of R1 and it is possible to reestablish a consistent image from the R2 device. The general mechanism for maintaining a consistent version of data when data is transferred asynchronously is described in U.S. Pat. No. 7,054,883 to Meiri, et al. and titled VIRTUAL ORDERED WRITES FOR MULTIPLE STORAGE DEVICES, which is incorporated by reference herein.

Figure 5:
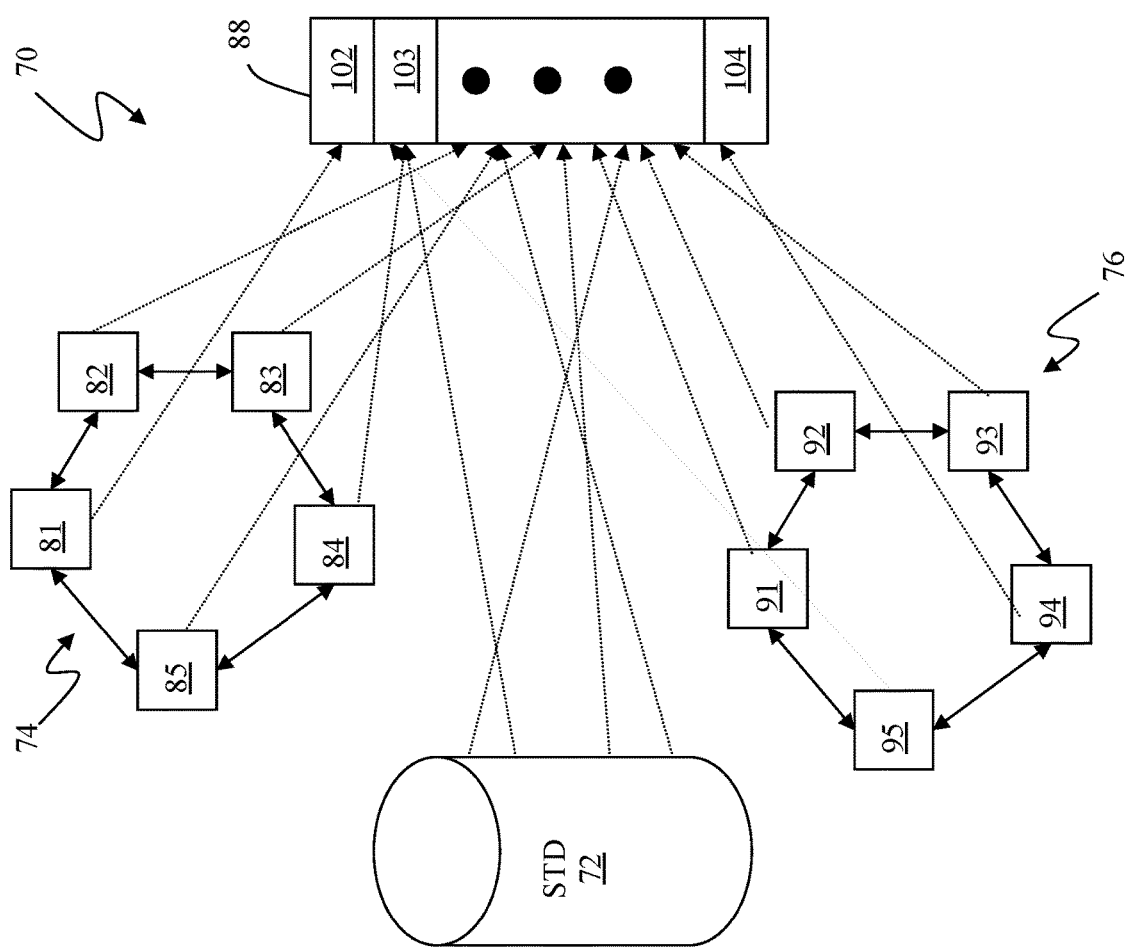
FIG. 5 is a schematic diagram illustrating items for constructing and manipulating chunks of data on a local storage system according to an embodiment of the system described herein.

Referring to FIG. 5, a diagram 70 illustrates items used to construct and maintain the chunks 52, 54. A standard LUN 72 contains data written by the host 22 and corresponds to the data element 51 of FIG. 4 and the physical storage units 33a-33c of FIG. 1. The LUN 72 contains data written by the host 22 to the local storage system 24. Two linked lists of pointers 74, 76 are used in connection with the LUN 72. The linked lists 74, 76 correspond to data and metadata that may be stored, for example, in the memory 37 of the local storage system 24. The linked list 74 contains a plurality of pointers 81-85, each of which points to a slot of a cache 88 used in connection with the local storage system 24. Similarly, the linked list 76 contains a plurality of pointers 91-95, each of which points to a slot of the cache 88. In some embodiments, the cache 88 may be provided in the memory 37 of the local storage system 24. The cache 88 contains a plurality of cache slots 102-104 that may be used in connection to writes to the LUN 72 and, at the same time, used in connection with the linked lists 74, 76. The cache 88 may be a conventional storage system cache.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N−1. Thus, when data is written by the host 22 to the local storage system 24, the data and possibly corresponding metadata is provided to the cache 88 and, in some cases (described elsewhere herein), an appropriate pointer of the linked list 74 is created. Note that the data will not be removed from the cache 88 until the data is destaged to the LUN 72 and the data is also no longer pointed to by one of the pointers 81-85 of the linked list 74, as described elsewhere herein. Metadata may be maintained in the cache 88 until the metadata is transmitted to a remote storage system, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22 (and possibly corresponding metadata) while the inactive one of the linked lists 74, 76 corresponds to the data (and possibly metadata) that is being transmitted from the local storage system 24 to the remote storage system 26.

While the data and metadata that is written by the host 22 is accumulated using the active one of the linked lists 74, 76 (for the sequence number N), the data and metadata corresponding to the inactive one of the linked lists 74, 76 (for previous sequence number N−1) is transmitted from the local storage system 24 to the remote storage system 26. The RA's 30a-30c use the linked lists 74, 76 to determine the data and metadata to transmit from the local storage system 24 to the remote storage system 26.

Once data and metadata corresponding to a particular one of the pointers in one of the linked lists 74, 76 has been transmitted to the remote storage system 26, the particular one of the pointers may be removed from the appropriate one of the linked lists 74, 76. Any slots corresponding to metadata for a LUN is removed from the cache 88 (i.e., the slot may be returned to a pool of slots for later, unrelated, use) after transmission. In addition, the data may also be marked for removal from the cache 88 provided that the data in the slot is not otherwise needed for another purpose (e.g., to be destaged to the LUN 72). A mechanism may be used to ensure that data is not removed from the cache 88 until all devices at the local storage system 24 are no longer using the data. Such a mechanism is described, for example, in U.S. Pat. No. 5,537,568 titled SYSTEM FOR DYNAMICALLY CONTROLLING CACHE MANAGER MAINTAINING CACHE INDEX AND CONTROLLING SEQUENTIAL DATA ACCESS to Yanai, et al. and issued on Jul. 16, 1996 and in U.S. Pat. No. 6,594,742 titled CACHE MANAGEMENT VIA STATISTICALLY ADJUSTED SLOT AGING to Josef Ezra and issued on Jul. 15, 2003, both of which are incorporated by reference herein.

Figure 6:
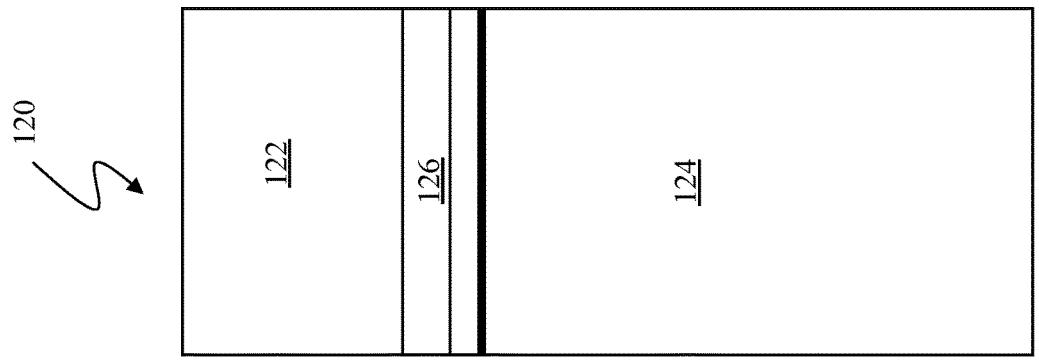
FIG. 6 is a diagram illustrating a data structure for a slot used in connection with an embodiment of the system described herein.

Referring to FIG. 6, a slot 120, like one of the slots 102-104 of the cache 88, includes a header 122 and data or metadata 124. The header 122 corresponds to overhead information used by the system to manage the slot 120. The data or metadata 124 is the corresponding data or metadata from the LUN 72 that is being (temporarily) stored in the slot 120. Information in the header 122 includes pointers back to the LUN 72, time stamp(s), etc. The header 122 also includes a cache stamp 126 having a field indicating the sequence number (e.g., N, N−1, N−2, etc.) of the data or metadata 124 of the slot 120. As described elsewhere herein, the sequence number field of the cache stamp 126 may be used to facilitate the processing described herein. In some cases, a flag may be used to distinguish between cache slots containing metadata and cache slots containing application data. The flag may be used by the remote storage system 26 to properly store application data and metadata on the R2 LUN. In some embodiments, a CRC value (or similar) may be used for the slot to enhance data integrity.

Figure 7:
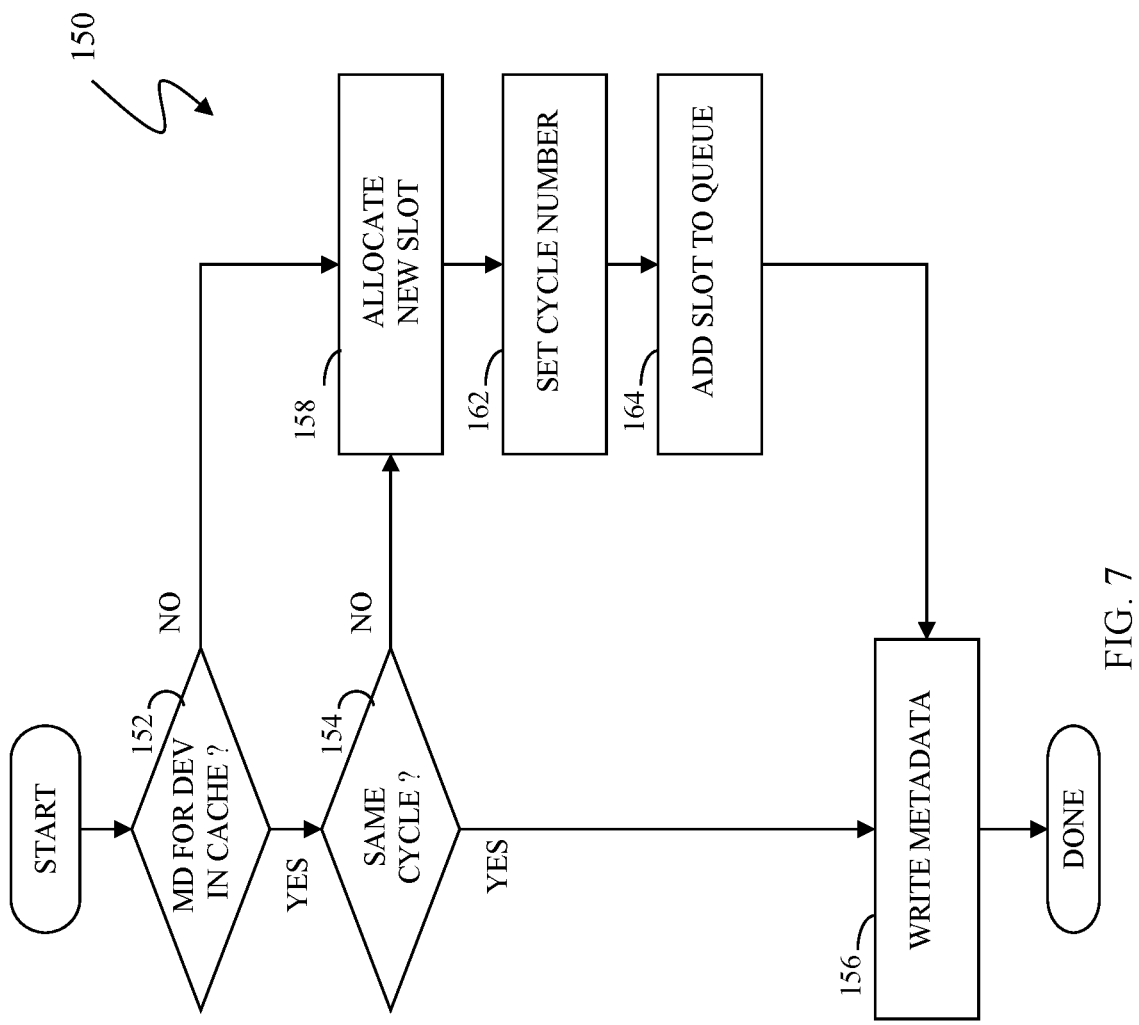
FIG. 7 is a flow diagram illustrating processing performed in connection with intercepting metadata write operations at a local storage system to copy metadata to a cache slot according to an embodiment of the system described herein.

Referring to FIG. 7, a flow diagram 150 illustrates processing performed in connection with handling metadata that is written for a LUN of the local storage system 24. In an embodiment herein, any metadata writes at the local storage system 24 may be intercepted using, for example, a conventional mechanism where system calls to write metadata cause the processing illustrated in the flow diagram 150 to be performed. Note that transferring metadata and data for a particular LUN may be independent so that, for example, metadata for a particular LUN may be transferred in a chunk of data without transferring any application data for the particular LUN or application data for a particular LUN may be transferred in a chunk of data without transferring any metadata for the particular LUN.

Processing for the flow diagram 150 begins at a test step 152 where it is determined if metadata for the particular LUN for which metadata is being written is already in a cache slot (described elsewhere herein). If so, then control transfers from the test step 152 to a test step 154 where it is determined if the metadata for the particular LUN corresponds to a current sequence number for which data is currently being collected (i.e., the sequence number N, described above). If so, then control transfers from the test step 154 to a step 156 where the metadata is written to the slot in the cache. In the system described herein, there is no more than one slot for each LUN and each sequence number combination. If metadata for a particular LUN and sequence number combination had previously been written, new data for the same LUN and sequence number combination overwrites the old data. Following the step 156, processing is complete.

If it is determined at the step 152 that metadata for the particular LUN for which metadata is being written is not already in a cache slot, then control transfers from the test step 152 to a step 158 where a new cache slot is allocated. Note that the step 158 may also be reached from the step 154 if it is determined at the test step 154 that the metadata in the cache slot is for a different sequence number than the number for which data is currently being collected. Following the step 158 is a step 162 where the sequence number for the slot is set to the current sequence number (i.e., the sequence number N discussed in connection with FIG. 4). Following the step 162 is a step 164 where the slot is added to the queue corresponding to the chunk (discussed elsewhere herein) for the current sequence number. Following the step 164, control transfers from the step 164 to the step 156, described above, where the metadata is written to the slot that was allocated at the step 158. Following the step 156, processing is complete.

Once the metadata has been provided to a cache slot and associated with a sequence number, the metadata may cycle through the various transitions illustrated in FIG. 4 and described elsewhere herein. When the metadata becomes part of a chunk that is being committed at the remote storage system 26 (i.e., the chunk 58 shown FIG. 4), the modified metadata is from the chunk 58 is used to modify the metadata of an appropriate one of the LUNs of the remote storage system 26. In some embodiments, writing application data to a chunk causes a flag (bit) to be set for a corresponding location of the local storage system 24 to indicate that the data is not in sync between the local storage system 24 and the remote storage system 26. The flag may be reset (cleared) in response to the remote storage device 26 acknowledging receipt of the data. This functionality may be extended to providing metadata to chunks so that a flag is set for a LUN when metadata for the LUN is modified and provided to a chunk at the local storage system 24 and the flag is reset (cleared) in response to receiving an acknowledgement from the remote storage system 26 that the metadata modifications have been received. In some embodiments, a LUN at the remote storage system 26 is not deemed consistent unless all of the application data and the metadata for a particular sequence number has been committed for the LUN. That is, the LUN may be considered inconsistent if only the application data or only the metadata has been committed.

Note that, although the system described herein has been illustrated for use in connection with virtual volumes (VVOLs) in a virtualization system, it is possible to use the mechanism for asynchronously copying metadata while maintaining write dependencies described herein in any type of appropriate system, including a storage system where none of the components are virtual. Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining consistency for asynchronous replication of logical devices (LUNs) of a local storage system to corresponding LUNs of a remote storage system, comprising:
   copying application data written to the LUNs of the local storage system to corresponding cache slots;
   copying metadata of the LUNs of the local storage system to corresponding cache slots of the local storage system in response to modifying the metadata of the LUNs;
   associating a first sequence number to all metadata modifications and all application data writes for any of the LUNs of the local storage system that are begun after a first time and before a second time;
   associating a second sequence number, different from the first sequence number, to all metadata modifications and all application data writes for any of the LUNs of the local storage system that are begun after the second time; and
   after completion of all metadata modifications and all application data writes associated with the first sequence number, initiating transfer to the remote storage system of all metadata modifications and all application data writes associated with the first sequence number.

2. A method, according to claim 1, wherein metadata for a particular one of the LUNs of the local storage system that is modified after the first time and before the second time overwrites data in the cache for previously modified metadata for the particular one of the LUNs that was modified after the first time and before the second time.

3. A method, according to claim 1, wherein the metadata modifications and the application data writes associated with the first sequence number are stored at the remote storage system in response to receiving a commit message from the local storage system.

4. A method, according to claim 1, wherein the local storage system uses a first list of pointers to the cache slots for application data and metadata associated with the first sequence number and uses a second list of pointers to the cache slots for application data and metadata associated with the second sequence number.

5. A method, according to claim 1, wherein each cache slot includes a field that indicates a corresponding sequence number.

6. A method, according to claim 1, wherein a new cache slot is allocated in response to a modification of metadata for a particular one of the LUNs of the local storage system after the first time and before the second time.

7. A method, according to claim 6, wherein the new cache slot is allocated only if the modification is a first modification for the metadata for the particular one of the LUNs after the first time and before the second time.

8. A method, according to claim 1, wherein the local storage system and the remote storage system store virtual volumes that are accessed by virtual machines.

9. A method, according to claim 1, wherein a particular one of the LUNs of the remote storage system is determined to be consistent only if all of the application data and all of the metadata corresponding to a particular sequence number have been committed at the remote storage system.

10. A method, according to claim 1, wherein all metadata modifications and all application data writes for any of the LUNs of the local storage system that are begun after the second time are stored in different cache slots than any metadata modifications and application data writes for any of the LUNs of the local storage system that are begun before the second time.

11. A non-transitory computer readable medium containing software that maintains consistency for asynchronous replication of logical devices (LUNs) of a local storage system to corresponding LUNs of a remote storage system, the software comprising:
  executable code that copies application data written to the LUNs of the local storage system to corresponding cache slots;
  executable code that copies metadata of the LUNs of the local storage system to corresponding cache slots of the local storage system in response to modifying the metadata of the LUNs;
  executable code that associates a first sequence number to all metadata modifications and all application data writes for any of the LUNs of the local storage system that are begun after a first time and before a second time;
  executable code that associates a second sequence number, different from the first sequence number, to all metadata modifications and all application data writes for any of the LUNs of the local storage system that are begun after the second time; and
  executable code that initiates transfer to the remote storage system of all metadata modifications and all application data writes associated with the first sequence number after completion of all metadata modifications and all application data writes associated with the first sequence number.

12. A non-transitory computer readable medium, according to claim 11, wherein metadata for a particular one of the LUNs of the local storage system that is modified after the first time and before the second time overwrites data in the cache for previously modified metadata for the particular one of the LUNs that was modified after the first time and before the second time.

13. A non-transitory computer readable medium, according to claim 11, wherein the metadata modifications and the application data writes associated with the first sequence number are stored at the remote storage system in response to receiving a commit message from the local storage system.

14. A non-transitory computer readable medium, according to claim 11, wherein the local storage system uses a first list of pointers to the cache slots for application data and metadata associated with the first sequence number and uses a second list of pointers to the cache slots for application data and metadata associated with the second sequence number.

15. A non-transitory computer readable medium, according to claim 11, wherein each cache slot includes a field that indicates a corresponding sequence number.

16. A non-transitory computer readable medium, according to claim 11, wherein a new cache slot is allocated in response to a modification of metadata for a particular one of the LUNs of the local storage system after the first time and before the second time.

17. A non-transitory computer readable medium, according to claim 16, wherein the new cache slot is allocated only if the modification is a first modification for the metadata for the particular one of the LUNs after the first time and before the second time.

18. A non-transitory computer readable medium, according to claim 11, wherein the local storage system and the remote storage system store virtual volumes that are accessed by virtual machines.

19. A non-transitory computer readable medium, according to claim 11, wherein a particular one of the LUNs of the remote storage system is determined to be consistent only if all of the application data and all of the metadata corresponding to a particular sequence number have been committed at the remote storage system.

20. A non-transitory computer readable medium, according to claim 11, wherein all metadata modifications and all application data writes for any of the LUNs of the local storage system that are begun after the second time are stored in different cache slots than any metadata modifications and application data writes for any of the LUNs of the local storage system that are begun before the second time.

* * * * *